US011114209B2

(12) United States Patent
Liszkai

(10) Patent No.: US 11,114,209 B2
(45) Date of Patent: Sep. 7, 2021

(54) NUCLEAR REACTOR MODULE WITH A COOLING CHAMBER FOR A DRIVE MOTOR OF A CONTROL ROD DRIVE MECHANISM

(71) Applicant: NuScale Power, LLC, Corvallis, OR (US)

(72) Inventor: Tamas Liszkai, Corvallis, OR (US)

(73) Assignee: NuScale Power, LLC, Corvallis, OR (US)

(*) Notice: Subject to any disclaimer, the term of this patent is extended or adjusted under 35 U.S.C. 154(b) by 285 days.

(21) Appl. No.: 16/226,298

(22) Filed: Dec. 19, 2018

(65) Prior Publication Data

US 2019/0206579 A1 Jul. 4, 2019

Related U.S. Application Data

(60) Provisional application No. 62/611,754, filed on Dec. 29, 2017.

(51) Int. Cl.
| | | |
|---|---|---|
| *G21C 7/14* | (2006.01) | |
| *G21C 13/04* | (2006.01) | |
| *G21C 1/32* | (2006.01) | |
| *G21C 7/10* | (2006.01) | |

(52) U.S. Cl.
CPC .............. *G21C 7/14* (2013.01); *G21C 1/32* (2013.01); *G21C 7/10* (2013.01); *G21C 13/04* (2013.01)

(58) Field of Classification Search
CPC ... G21C 1/32; G21C 7/12; G21C 7/14; G21C 13/02; G21C 13/022; G21C 13/028; G21C 13/04

USPC ................................................. 376/285, 293
See application file for complete search history.

(56) References Cited

U.S. PATENT DOCUMENTS

| | | | | | |
|---|---|---|---|---|---|
| 2,937,984 | A | * | 5/1960 | Chapellier | ............... G21C 7/12 376/229 |
| 4,828,789 | A | * | 5/1989 | Hankinson | ............. G21C 11/02 376/287 |
| 5,323,427 | A | * | 6/1994 | Hankinson | ........... G21C 13/028 376/203 |

(Continued)

FOREIGN PATENT DOCUMENTS

| | | |
|---|---|---|
| DE | 2514312 A1 | 10/1976 |
| JP | 2014163760 A1 | 9/2014 |

OTHER PUBLICATIONS

Perkowski, Joseph. Small Modular Reactors: Institutional Assessment. No. INL/EXT-12-26412. Idaho National Laboratory (INL), 2012. (Year: 2012).*

(Continued)

*Primary Examiner* — Jack W Keith
*Assistant Examiner* — Jinney Kil
(74) *Attorney, Agent, or Firm* — Perkins Coie LLP

(57) ABSTRACT

In some embodiments, a nuclear reactor vessel comprises a containment vessel for a reactor pressure vessel (RPV); a control rod drive mechanism (CRDM) located in the containment vessel, the CRDM including drive motors configured to move control rods into and out of a nuclear reactor core located in the RPV; and a partition extending across a portion of the containment vessel configured to retain the drive motors in a separate fluid-tight barrier region within the containment vessel. Other embodiments may be disclosed and/or claimed.

11 Claims, 4 Drawing Sheets

(56) References Cited

U.S. PATENT DOCUMENTS

| | | | |
|---|---|---|---|
| 8,711,998 B2* | 4/2014 | Uda | G21C 7/08 376/243 |
| 2013/0223579 A1* | 8/2013 | Allen | G21C 7/14 376/219 |
| 2013/0235968 A1* | 9/2013 | Young | G21C 15/26 376/395 |
| 2016/0217578 A1* | 7/2016 | Can | G01C 19/5698 |
| 2016/0232996 A1* | 8/2016 | Liszkai | F01K 5/00 |
| 2017/0117063 A1* | 4/2017 | Keller | G21C 13/02 |
| 2018/0019027 A1* | 1/2018 | Morgan | H02K 9/19 |

OTHER PUBLICATIONS

Lorenzini, Paul. NuScale Pre-Application Meeting. 2008. (Year: 2008).*

Joint Select Task Force on Nuclear Energy. Overview of New Nuclear Technologies. 2014. (Year: 2014).*

International Search Report and Written Opinion; App. No. PCT/US2018/066569; Filed Dec. 19, 2018; dated Mar. 15, 2019; pp. 1-14.

* cited by examiner

NUCLEAR REACTOR MODULE WITH A COOLING CHAMBER FOR A DRIVE MOTOR OF A CONTROL ROD DRIVE MECHANISM

PRIORITY

This application claims priority to U.S. Provisional Patent Application No. 62/611,754, filed on Dec. 29, 2017 and entitled: AIR COOLING CHAMBER FOR CRDM DRIVE MOTOR, which is herein incorporated by reference in its entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to cooling in a containment vessel of a nuclear reactor module, and some embodiments relate to a nuclear reactor module with a cooling chamber for a drive motor of a CRDM (control rod drive mechanism).

BACKGROUND

Convective heat transfer is the transfer of heat from one place to another by the movement of fluids (liquids or gasses). Convective heat transfer may include both forced convection (pumps to move liquid through hoses to carry away heat from a source, fans to drive the movement of air over fins or the like to carry away heat from the source, etc.) and natural convection (in which buoyancy forces that result from density variations drive the movement of the fluid).

Some nuclear reactor modules include a reactor pressure vessel (RPV) housed inside a containment vessel (CNV). These nuclear reactor modules may include a reactor component cooling water (RCCW) system to support components inside and outside the reactor module. The RCCW system may include pumps and cooling lines outside of the CNV to dissipate heat from components outside the CNV. The RCCW system may also include cooling lines penetrating the CNV—to cool components within the CNV.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
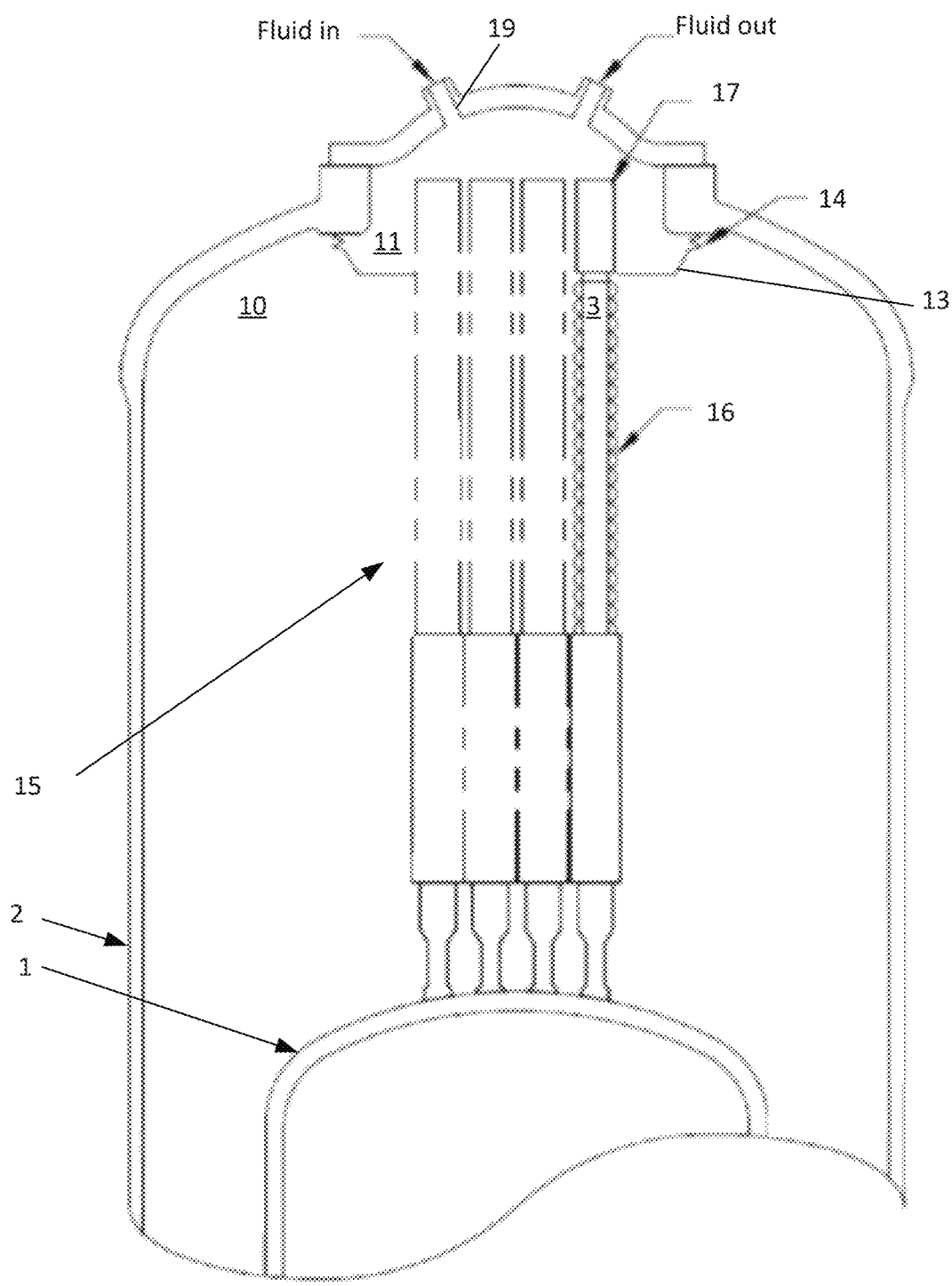
FIG. 1 illustrates a cross-sectional view of a containment vessel with a cooling chamber for a drive motor of a CRDM (control rod drive mechanism), according to various embodiments.

Reduction of cooling lines inside the CNV (such as cooling lines of an RCCW system outside the CNV or any other cooling line inside the CNV) is desirable for a number of reasons. The environment inside the CNV may be depressurized (e.g., in vacuum, meaning less than atmospheric pressure) and high temperature (e.g., 600 degrees F.), and seals between these openings and the cooling lines provide leak paths for atmosphere to leak into the CNV resulting in outage time and loss of power generation. Also, each cooling line consumes valuable space inside the CNV—reducing cooling lines inside in the CNV may support reduction of the overall dimensions of the CNV. Cooling lines may also break, and diagnosing and/or repairing any cooling line, particularly those within the CNV, may be expensive.

Some known nuclear reactor modules may include an RCCW system external to the CNV, including cooling lines extending into the CNV to dissipate heat from CRDM magnetic coils and/or CRDM drive motors. Some embodiments described herein eliminate some or all of such cooling lines by partitioning a section (e.g., an upper section) inside the CNV into a vacuum chamber for CRDM coils and a fluid-filled chamber for CRDM drive motors or other coils. The section may be partitioned using any fluid-tight partition.

Any fluid-tight partition described herein may allow for differential movement between the CRDMs and the CNV. In some embodiments, an attachment section of the fluid-tight partition (to attach to the CRDM) may move relative to the CNV (e.g., with the CRDM housings). In some embodiments, the attachment section may be a rigid plate with an array of openings with each opening around one of the CRDM housings. The attachment section may be sealingly coupled to the CRDM drive by welding, o-rings around the CRDM housings, or the like, or combinations thereof. The fluid-tight partition may include an expansion section, such as a bellows (e.g., metal bellows), membranes, expansion joints, omega seals, or the like, or combinations thereof, to expand in response to movement of the CRDM housings towards the CNV, and contract in response to movement of the CRDM housings away from the CNV.

The fluid-filled chamber may contain the drive motors and/or air (or some other fluid) that is thermally coupled to the drive motors. Natural and/or forced convective heat transfer may be used to remove heat from the drive motors using the air or other fluid in the fluid-filled chamber. When the CRDM housing is maneuvered using a fine motion control drive using an electric motor on top of the CRDM, heat generated by the energy supplied to the motor may be removed by an atmospheric air cooling environment.

In some embodiments, the fluid-supply system may be an air-supply system, which may be substantially less expensive and reliable than an RCCW and may eliminate the need for hoses and piping inside containment. In embodiments with forced convection, a fluid-supply system may be placed on top of the nuclear reactor module or located in a common area remote from the CNV.

In some embodiments, penetrations on top of the CNV (or some other location corresponding to the fluid-filled chamber) may provide supply air and remove air as necessary in a forced flow system or enable natural convection to cool the drive motors. These penetrations may be isolated from the vacuum chamber by the fluid-tight partition, and as such, may not require seals (in fact, in natural convection embodiments these penetrations may be unrestricted vents).

As far as the vacuum chamber, by way of background, recent development in high temperature coil technology may allow placement of magnetic coils in a harsh environment similar to what is experienced inside some CNVs. These magnetic coils may be referred to as high temperature magnetic coils. High temperature magnetic coils may be located in the vacuum chamber and not energized to the levels that would require heat removal by water cooling. Water or other form of cooling to the coils may be eliminated. In other embodiments, any coils may be used in the vacuum chamber if their energy input is low and/or intermittent (e.g., if they are only energized intermittently—not long enough to increase their temperature beyond their operating range). In these embodiments, water cooling to the coils may be eliminated too.

Some embodiments described herein may include a nuclear reactor module with a cooling chamber for a drive motor of a control rod drive mechanism. This nuclear reactor module may include a containment vessel for a reactor pressure vessel (RPV); a control rod drive mechanism (CRDM) located in the containment vessel, the CRDM including drive motors configured to move control rods into and out of a nuclear reactor core located in the RPV; and a partition extending across a portion of the containment vessel configured to retain the drive motors in a separate fluid-tight barrier region within the containment vessel.

FIG. 1 illustrates a cross-sectional view of a containment vessel 2 with a cooling chamber 11 for a drive motor 17 of a CRDM (control rod drive mechanism) 15, according to various embodiments. The cooling chamber 11 may be separate from the chamber 10, which may be a vacuum chamber (e.g., depressurized to less than atmospheric pressure). The CRDM 15 may include high temperature magnetic coils 16 (or some other coils) that can operate in the high temperature environment of the chamber 10 (e.g., 600 F) without water cooling.

The CRDM 15 and/or the shafts 3 inside housings, respectively, of the CRDM 15 may move relative to the containment vessel 2 and the RPV 1 to control movement of rods (not shown), each rod is connected to a corresponding one of the shafts 3) into and out of a nuclear reactor core (not shown) located in the RPV 1. This movement may be driven by the drive motor 17. During movement, the drive motor 17 may generate heat, and this heat may be removed by a fluid forced (e.g., by a fan, pump, or some other active component, not shown) or drawn in through the opening 19 (heated fluid may exit another opening).

Unlike the openings for cooling lines in some containment vessels, the opening 19 is not exposed to a vacuum environment inside the nuclear reactor module. The fluid-tight barrier 13 isolates a portion of the containment vessel 2 from the vacuum environment, and the opening 19 is formed in this portion of the containment vessel 2.

Figure 2:
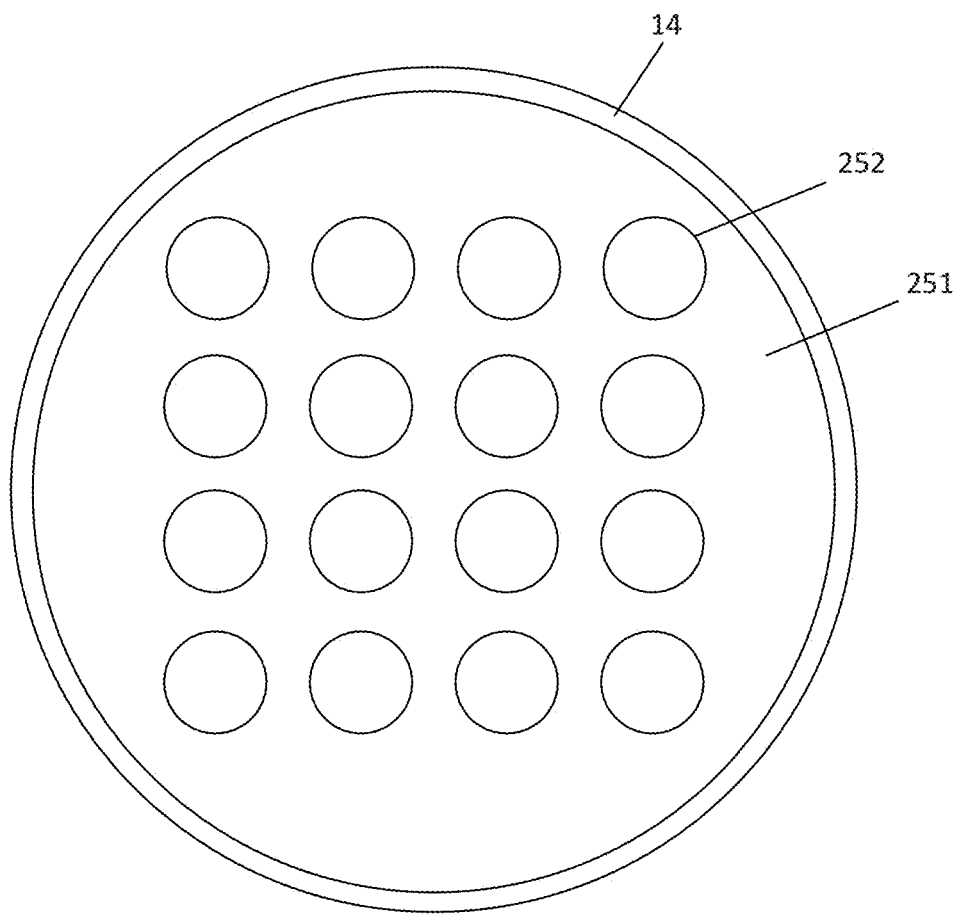
FIG. 2 illustrates a bottom view of the fluid-tight partition of FIG. 1, according to various embodiments.

In this embodiment, the fluid-tight barrier 13 comprises an expansion section 14 sealingly coupled (e.g., welded) to an interior of the containment vessel. In this embodiment, the expansion section 14 is illustrated as a bellows, but in other embodiments the expansion section may comprises membranes, expansion joints, omega seals, a bellows, or the like, or combinations thereof. FIG. 2 illustrates a bottom view of the fluid-tight barrier 13. Referring now to FIG. 2, the fluid-tight barrier 13 may include an attachment section 251 connected to the other side of the expansion section 13. The attachment section 251 may include a rigid structure, such as a plate. An array of openings 252 may be formed in the attachment section for each of the CRDM housings (FIG. 1). The attachment section 251 and each CRDM housing may be sealingly coupled (e.g., welded and/or coupled using o-rings) where they contact in the openings 252.

Referring again to FIG. 1, a portion of the fluid-tight barrier 13 (e.g., including the attachment section 251, FIG. 2) may move with the CRDM 15 relative to the containment vessel 2 and the RPV 1. The expansion section 14 may expand when the CRDM 15 moves toward the RPV 1, and compress when the CRDM 15 moves away from the RPV 1.

Figure 3:
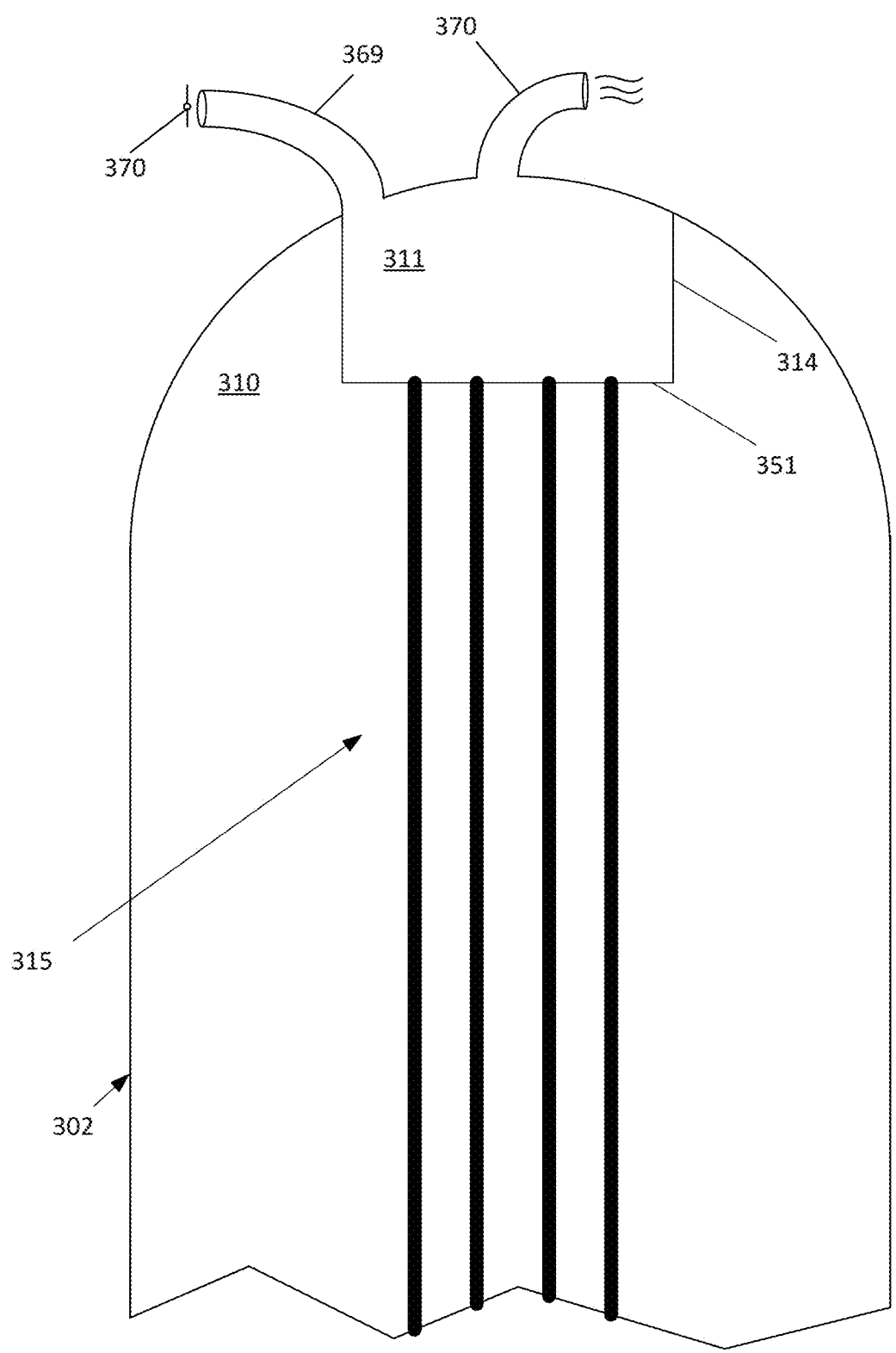
FIG. 3 illustrates a cross-sectional view of another containment vessel with a cooling chamber for a drive motor of a CRDM, according to various embodiments.

FIG. 3 illustrates a cross-sectional view of another containment vessel 302 with a cooling chamber 311 for a drive motor (not shown) of a CRDM 315, according to various embodiments. The CRDM 315 may be similar in any respect to any CRDM described herein, such as the CRDM 15 of FIG. 1. The fluid-tight barrier 314 may be similar in any respect to any fluid-tight barrier described herein, such as the fluid-tight barrier 14 of FIG. 1. An attachment section 351 may be similar in any respect to any attachment section described herein, such as the attachment section 251 of FIG. 2.

A portion of the drive motor may be below the attachment section 351 so long as the drive motor is thermally coupled to the fluid of the cooling chamber 311. For instance, the drive motor may be part of a drive motor assembly, and the attachment section 351 may be welded to the drive motor assembly. The drive motor assembly may include a fluid tight housing that exposes the drive motor to a fluid of the cooling chamber 311 to thermally couple the drive motor to the fluid and to isolate the fluid from the vacuum environment 310. In one example it may be possible and practical to weld the attachment section 351 to an end of the CRDM at the drive motor assembly.

FIG. 3 also illustrates that an ingress hose 369 may be coupled to an ingress opening for the cooling chamber 311. An active component such as a fan may force air into the ingress hose 369. The heated air may exit through an egress hose 370 coupled to an egress opening for the cooling chamber 311 due to a positive air pressure created by the active component and/or natural convection (the egress opening may be located higher than the ingress opening to aid thermal transfer). In other embodiments, an active component may be installed at the egress hose 370 to create negative pressure in the cooling chamber 311, which may draw air into the ingress house 369. In contrast to water cooling lines that extend inside a containment vessel, hoses 360 and 370 may be entirely located outside the CNV 302.

In some examples, hosing may be used for only one of ingress/egress, and the other opening may comprise a vent with no hosing. In yet other examples, all openings may be vents with no hoses. Also, there may be any number of egress/ingress openings/hoses/fans/vents, etc.

Also, as mentioned, an active component may not be required if natural convection is adequate to remove heat. Also, in some examples, it may be possible and practical to install insulation along the fluid-tight barrier 314 (on one or both sides) to reduce heat transfer from the high temperature vacuum environment of the chamber 310 into the cooling chamber 311, to minimize the amount of heat to be removed through the egress opening.

Figure 4:
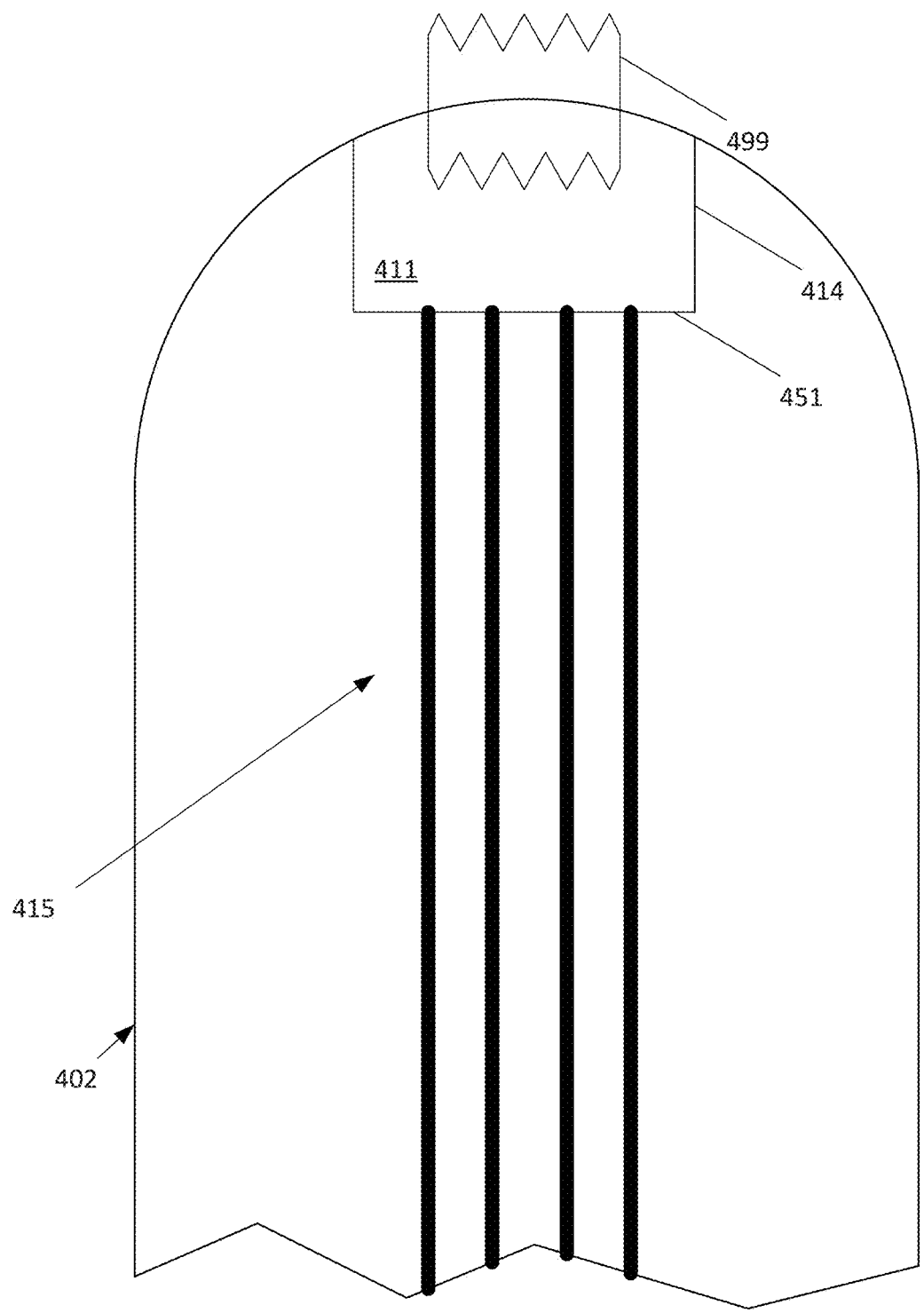
FIG. 4 illustrates a cross-sectional view of yet another containment vessel with a cooling chamber for a drive motor of a CRDM, according to various embodiments.

FIG. 4 illustrates a cross-sectional view of yet another containment vessel 402 with a cooling chamber 411 for a drive motor of a CRDM 415, according to various embodiments. The CRDM 415 may be similar in any respect to any CRDM described herein, such as the CRDM 15 of FIG. 1. The fluid-tight barrier 414 may be similar in any respect to any fluid-tight barrier described herein, such as the fluid-tight barrier 14 of FIG. 1. An attachment section 451 may be similar in any respect to any attachment section described herein, such as the attachment section 251 of FIG. 2.

In this example, a heat exchanger 499 (schematically illustrated) may be coupled to (or formed) from the portion of the containment vessel 402 associated with the cooling chamber to remove heat generated by the drive motor of the CRDM 415 by thermal conduction, convective heat transfer, thermal radiation, or the like, or combinations thereof. The containment vessel 402 may or may not include openings (a heat exchanger component such as a heat pipe may be positioned in an opening). The heat exchanger 499 may include any components of any known heat exchangers and/or part of the containment vessel itself (the containment vessel wall may provide conductive heat transfer, for example).

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope.

Examples

Example 1 is an apparatus comprising a containment vessel for a reactor pressure vessel (RPV); a control rod drive mechanism (CRDM) located in the containment vessel, the CRDM including drive motors configured to move control rods into and out of a nuclear reactor core located in the RPV; and a partition extending across a portion of the containment vessel configured to retain the drive motors in a separate fluid-tight barrier region within the containment vessel.

Example 2 may include the subject matter of example 1 and/or any other example herein, wherein the partition comprises: an attachment section having a side sealingly coupled to the CRDM; and an expansion section coupled to another side of the attachment section, the expansion section to expand to permit the attachment section to move with the CRDM relative to the containment vessel.

Example 3 may include the subject matter of any of example 1 and/or any other example herein, wherein the expansion section comprises a bellows, a membrane, an expansion joint, or an omega seal.

Example 4 may include the subject matter of any of examples 1-3 and/or any other example herein, wherein the attachment section comprises a plate.

Example 5 may include the subject matter of any of examples 1-4 and/or any other example herein, wherein the expansion section is sealingly coupled to the portion of the containment vessel.

Example 6 may include the subject matter of any of examples 1-5 and/or any other example herein, wherein separate fluid-tight barrier region within the containment vessel comprises a first region, and wherein a second region of the containment vessel comprises a vacuum environment.

Example 7 may include the subject matter of any of examples 1-6 and/or any other example herein, wherein the partition isolates the portion of the containment vessel from the vacuum environment, and wherein the portion of the containment vessel comprises one or more openings to exchange air outside the containment vessel with air inside the separate fluid-tight barrier region.

Example 8 may include the subject matter of any of examples 1-6 and/or any other example herein, further comprising an active device located outside the containment vessel to force the air outside the containment vessel through an ingress one of the one or more openings into the separate fluid-tight barrier region or force the air inside the separate fluid-tight barrier region through an egress one of the one or more openings to move heat generated by the drive motors out of the containment vessel.

Example 9 may include the subject matter of any of examples 1-8 and/or any other example herein, wherein the separate fluid-tight barrier region comprises air at a higher density than any air located in a vacuum region of the containment vessel.

Example 10 may include the subject matter of any of examples 1-9 and/or any other example herein, further comprising a heat exchanger located on the portion of the containment vessel to remove heat generated by the drive motors from the containment vessel.

Example 11 is an apparatus, comprising: a containment vessel including a first section to house a reactor pressure vessel of a nuclear reactor module and a second different section above the first section; a control rod drive mechanism (CRDM) located in the second section, the CRDM to control movement of the CRDM relative to the containment vessel; a fluid-tight barrier around the CRDM, the fluid-tight barrier and the CRDM partitioning the second section into a vacuum chamber and a fluid-filled chamber, wherein at least a portion of the CRDM is positioned in the vacuum chamber; wherein one or more CRDM drive motors of the CRDM are thermally coupled to a fluid of the fluid-filled chamber.

Example 12 may include the subject matter of any of example 11 and/or any other example herein, wherein the fluid-tight barrier comprises an attachment section sealingly coupled to the CRDM and an expansion section to expand to permit the attachment section to move with the CRDM relative to the containment vessel.

Example 13 may include the subject matter of any of examples 11-12 and/or any other example herein, wherein the attachment section comprises a plate with an opening for each CRDM housing of the CRDM.

Example 14 may include the subject matter of any of examples 11-13 and/or any other example herein, wherein the expansion section comprises a bellows, a membrane, an expansion joint, or an omega seal.

Example 15 may include the subject matter of any of examples 11-14 and/or any other example herein, wherein the attachment section is welded to the CRDM.

Example 16 may include the subject matter of any of examples 11-15 and/or any other example herein, wherein the at least the portion of the CRDM comprises one or more CRDM magnetic coils.

Example 17 may include the subject matter of any of examples 11-16 and/or any other example herein, wherein the at least the portion of the CRDM comprises a first section of the CRDM and a second different section of the CRDM is positioned in the fluid-filled chamber.

Example 18 may include the subject matter of any of examples 11-17 and/or any other example herein, wherein one region of the fluid-tight barrier is sealingly coupled to an interior of the containment vession and another different region of the fluid-tight barrier is sealingly coupled to the CRDM.

Example 19 may include the subject matter of any of examples 11-18 and/or any other example herein, wherein the fluid comprises air.

Example 20 may include the subject matter of any of examples 11-19 and/or any other example herein, further comprising plural fluid exchange openings in the containment vessel to form fluid paths in and out of the fluid-filled chamber.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. An apparatus, comprising:
    a containment vessel having a first, fluid-containing region and a second, vacuum region, the second region housing a reactor pressure vessel of a nuclear reactor module, and the first region positioned above the second region;
    a control rod drive mechanism (CRDM) partially housed in the first region to control movement of control rods relative to the containment vessel;
    a fluid-tight barrier positioned around the CRDM, the fluid-tight barrier and the CRDM partitioning the first and second regions from each other wherein at least a portion of the CRDM is positioned in the second region and wherein one or more CRDM drive motors of the CRDM are thermally coupled with fluid in the first region;
    a fluid inlet positioned to direct the fluid into the first region, and
    a fluid outlet positioned to direct the fluid out of the first region.

2. The apparatus of claim 1, wherein the fluid inlet is positioned to direct air into the first region.

3. The apparatus of claim 2, further comprising an active device located outside the containment vessel to force the air outside the containment vessel through the fluid inlet into the first region.

4. The apparatus of claim 2, wherein the first region comprises air at a higher density than any air located in the second region.

5. The apparatus of claim 1, further comprising a heat exchanger positioned in thermal communication with the drive motors to remove heat generated by the drive motors from the containment vessel.

6. The apparatus of claim 1, wherein the fluid-tight barrier comprises an attachment section sealably coupled with the CRDM, and an expansion section coupled between the CRDM and the containment vessel to permit the attachment section to move with the CRDM relative to the containment vessel.

7. The apparatus of claim 6, wherein the CRDM is one of multiple CRDMs, and wherein individual CRDMs include a CRDM housing, and wherein the attachment section comprises a plate with an opening for each CRDM housing.

8. The apparatus of claim 6, wherein the expansion section comprises a bellows.

9. The apparatus of claim 6, wherein the attachment section is welded to the CRDM.

10. The apparatus of claim 1, wherein the at least the portion of the CRDM comprises one or more CRDM magnetic coils.

11. The apparatus of claim 1, wherein the fluid comprises air.

* * * * *